United States Patent

[11] 3,626,877

[72] Inventors Harold Valentine Hansen
Cordova;
Robert Leroy Chidester, East Moline; Hans
Joachim Roehricht, Rock Island, all of Ill.
[21] Appl. No. 720,895
[22] Filed Apr. 12, 1968
[45] Patented Dec. 14, 1971
[73] Assignee Deere & Company
Moline, Ill.

[54] PLANTER
4 Claims, 9 Drawing Figs.
[52] U.S. Cl. ................................................ 111/85,
111/77, 221/185
[51] Int. Cl. ................................................ A01c 7/04
[50] Field of Search ................................................ 111/73, 80,
52, 36, 8, 75, 77–78, 80, 85; 221/68, 126, 175;
222/144.5, 330, 331, 484, 485, 481, 482, 486,
548, 553

[56] References Cited
UNITED STATES PATENTS

| A.I.43 | 5/1841 | Gibbons | 111/77 |
|---|---|---|---|
| 350,964 | 10/1886 | Atkinson et al. | 111/77 |
| 353,445 | 11/1886 | Fraser | 111/78 |
| 488,239 | 12/1892 | Cayton | 111/77 |
| 545,582 | 9/1895 | Elward | 111/75 X |
| 619,740 | 2/1899 | Forister | 111/77 |
| 662,135 | 11/1900 | Roop | 111/80 X |
| 812,057 | 2/1906 | Little | 111/77 |
| 2,615,408 | 10/1952 | Hylten-Cavallius | 111/78 |
| 28,049 | 5/1860 | Badgley | 111/77 |
| 2,022,354 | 11/1935 | Kirk | 111/73 X |
| 2,194,202 | 3/1940 | Graham | 111/36 UX |
| 379,834 | 3/1888 | Turner | 222/144.5 X |
| 936,883 | 10/1909 | Garwood | 111/77 |
| 1,095,136 | 4/1914 | Bahner | 111/77 |
| 2,379,724 | 7/1945 | Lanham | 111/77 X |
| 2,560,732 | 7/1951 | Moore | 222/482 |
| 2,698,114 | 12/1954 | Buhr | 222/486 X |
| 2,740,571 | 4/1956 | Busto | 222/144.5 X |
| 2,855,876 | 10/1958 | Van Deren | 111/52 |
| 2,919,158 | 12/1959 | Aller | 222/553 X |
| 3,343,507 | 9/1967 | Smith | 111/73 |

FOREIGN PATENTS

| 454,786 | 10/1936 | Great Britain | 222/331 |
|---|---|---|---|
| 365,821 | 12/1938 | Italy | 111/80 |

Primary Examiner—Robert E. Bagwill
Attorneys—H. V. Harsha, Harold M. Knoth, William A. Murray and John M. Nolan ABSTRACT: A row planting mechanism having a single seed hopper, the discharge of the hopper being selectively directed to either a sliding finger seed selector operable to select corn and similar crop seed for planting at evenly spaced intervals of 6 inches or more, or a single-run seed selecting mechanism operable to select sorghum, soy beans and similar crop seed for planting at intervals appreciably less than 6 inches.

Patented Dec. 14, 1971

INVENTORS
HAROLD V. HANSEN
ROBERT L. CHIDESTER
HANS J. ROEHRICHT

BY John C. Thompson

ATTORNEY

INVENTORS
HAROLD V. HANSEN
ROBERT L. CHIDESTER
HANS J. ROEHRICHT

BY *John C. Thompson*

ATTORNEY

*INVENTORS*
HAROLD V. HANSEN
ROBERT L. CHIDESTER
HANS J. ROEHRICHT

PLANTER

FIELD OF THE INVENTION

The present invention relates generally to agricultural equipment and more particularly to planters of the type designed to plant corn and other crop seed in rows.

DESCRIPTION OF THE PRIOR ART

In many farm areas where corn is a major crop, it is common practice to plant an additional crop. The second crop is customarily soy beams in the Eastern Corn Belt and grain sorghum in the Western Corn Belt.

Most corn planters in use today are of the type having a rotatable seed plate disposed in the bottom of a hopper. These planters are capable of planting corn at equally spaced intervals of 6 or more inches at normal planting speeds. By changing the seed plate, the planter can also be used to plant other seeds, such as soy beans, grain sorghum, and edible beans, which are generally planted relatively closely together, for example, an inch apart. It is not necessary to plant these other seeds with uniform spacing between the seeds.

A new form of corn planter has a sliding finger seed selecting mechanism. Various forms of sliding finger seed selectors are disclosed in the U.S. Pat. Nos. to Keeton 3,308,774 issued on 14 Mar. 1967, Fisher 3,348,504 issued on 24 Oct. 1967, and in U.S. Pat. No. 3,552,601 issued 5 Jan. 1971 A planter embodying the sliding finger seed selector has a plurality of fingers mounted for rotational sliding movement against a fixed plate. The fingers, during operation of the planter, pass through a supply of seed and hold seed in engagement with the fixed plate until the seeds are discharged through an aperture in the plate, the seeds then being conveyed to the ground. This form of mechanism is quite suitable for use with corn and other crops where the seed is to be planted in equally spaced increments. The mechanism selects approximately 800 seeds per minute and plants the individual seed at 6 inch intervals at 4½ miles per hour. However, with crops such as soy beans, grain sorghum and the like, which are planted relatively close together, this type of mechanism is not suitable nor is the precision achieved by such a mechanism necessary. One reason why a sliding finger seed selector is not suitable is that the sliding finger seed selecting mechanism for corn has a seed engaging portion which is designed to engage corn, and it would be necessary to substitute a new seed engaging finger if soy beans or sorghum seeds were to be selected by this type of mechanism. Another reason why a corn selector is not suitable is that it would not be possible to select seed with a sliding finger-type seed selector at rates appreciably about 800 seeds per minute. However, it is customary to plant beans and sorghum at a rate appreciably in excess of 800 seeds per minute.

SUMMARY OF THE INVENTION

It is the principal object of this invention to provide a corn planter of the type having a sliding finger seed selector which is also capable of planting seed, such as sorghum and soy beans, at rates appreciably in excess of 800 seeds per minute.

More particularly, it is an object of this invention to provide a planter having a sliding finger seed selector for use with corn and a single-run seed selector for use with other crops, the planter having a single hopper which can be selectively connected to either of the seed pickup mechanisms whereby the desired type of seed selecting mechanism may be employed to plant the seed within the hopper.

These and other objects and advantages of this invention will be apparent to those skilled in the art after a consideration of the following detailed description, taken in conjunction with the accompanying drawings in which the preferred form of this invention is illustrated.

DESCRIPTION OF THE PREFERRED EMBODIMENT

Figure 1:
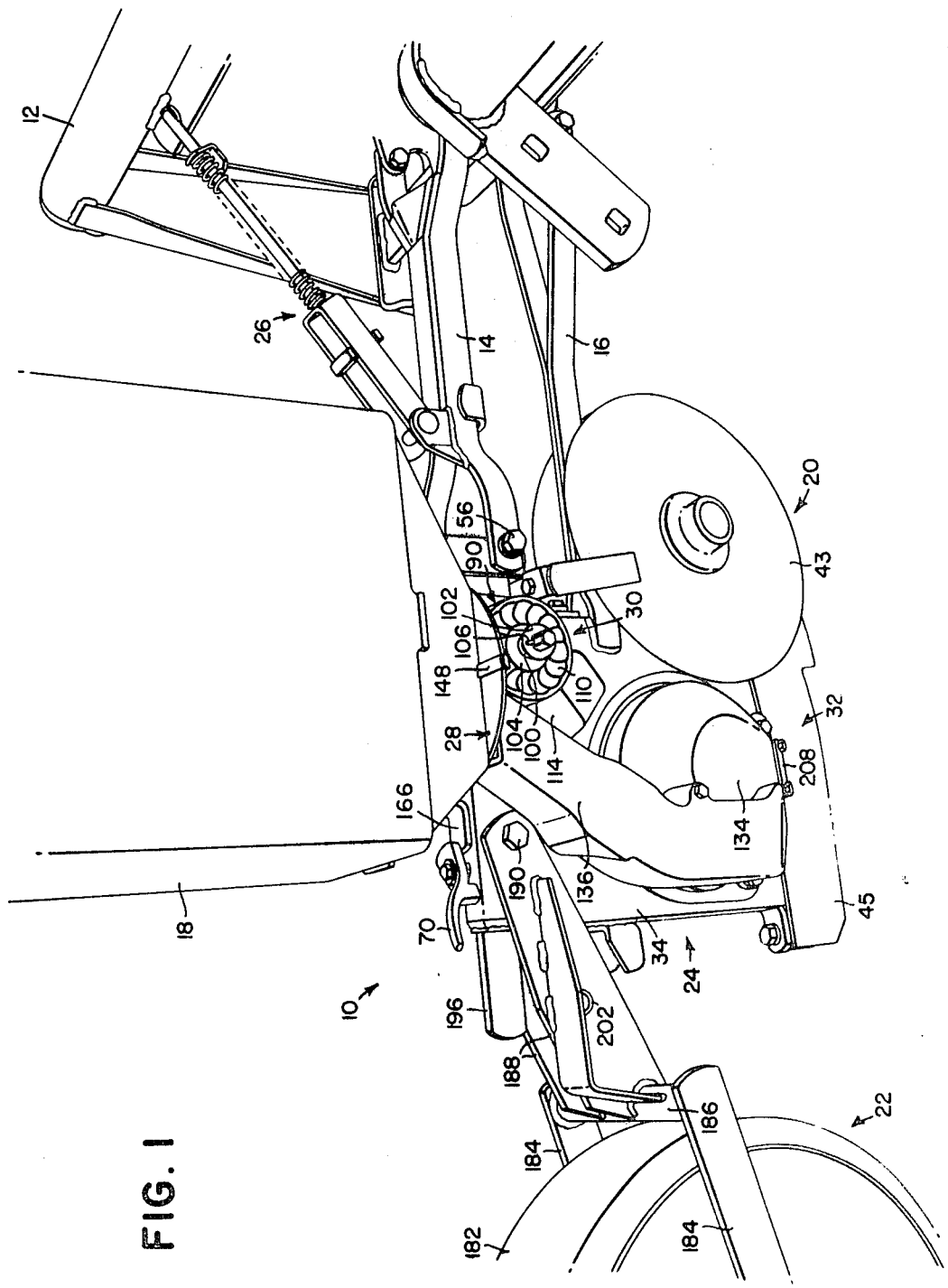
FIG. 1 is a perspective view of a planting unit taken from the right-hand side of the planting unit and showing a portion of the frame to which it is attached.

In the following description right-hand and left-hand reference is determined by standing to the rear of the planter and facing the direction of travel.

IN GENERAL

In corn planters and the like, it is customary to secure a plurality of row planting units, one of which is indicated at 10, to a transversely extending frame, indicated generally at 12. Each planting unit 10 is secured for vertical movement relative to the frame 12 by means of upper and lower parallel links 14, 16, respectively. Each planting unit includes a hopper 18, furrow opening means, indicated generally at 20, a press wheel assembly, indicated generally at 22, and a seed boot or shank assembly, indicated generally at 24. The forward end of the seed boot is pivotally secured to the upper and lower links 14 and 16 and spring link means, indicated generally at 26, are provided to normally bias the planter unit 10 downwardly.

In the form of the planter illustrated in the accompanying drawings, the hopper is provided with a pair of spaced apart discharge openings and a rotatable plane 28 having a single opening. The rotatable plate can be positioned in such a manner that either one opening of the seed hopper is in communication with a single-run seed selecting mechanism, indicated generally at 30, or the other opening is in communication with a sliding finger seed selecting mechanism, indicated generally at 32. The rotatable plate can also be so positioned to close off both openings in the hopper so that the seeds will not be able to flow from the hopper to either of the seed selecting mechanisms. The sliding finger seed selector is of the type disclosed in U.S. Pat. No. 3,552,601 and the seeds from the selector are discharged into a seed conveyor of the type disclosed in U.S. Pat. No. 3,308,774.

SEED BOOT CONSTRUCTION

The seed boot or shank 24 is formed principally of right and left spaced apart plates 34 and 36. These plates are secured at their upper end to a longitudinally extending tubular member 38. Front and rear members 40, 42 are welded to the front and rear edges of the plates 34, 36 and assist in holding these plates in spaced apart relation to each other. The furrow opener 20 is carried on the bottom of the boot 24 and includes a double disk opener 43 and a runner 45. The right plate is provided with an enlarged cutout portion or aperture 44 into which may be inserted a sliding finger seed selecting mechanism. A drive shaft for this seed selecting mechanism extends through a relatively small aperture 46 in the left plate 36. A metal strip 48 is disposed forwardly of the aperture 44 and extends between the plates 34, 36 to divide the space between the plates into two chambers. The rear chamber has the aperture 44 that receives the sliding finger seed selector. The forward chamber is provided with a seed tube 50 which receives seed from the single-run seed selecting mechanism through an aperture 52 in the right-hand plate 34. The strip 48 extends rearwardly along the bottom of plates 34 and 36 below a portion of the sliding finger seed selecting mechanism, and terminates at a rear end 53 so as to define an opening 55 with the bottom edges of the plates 34, 36, and the rear member 42. Seeds from the sliding finger seed selector are discharged through the opening 55 and fall between the sides of the runner 45 into a furrow in the ground. Similarly, the seed discharged through the tube 50 is discharged between the sides of the runner 45 and into a furrow in the ground.

A transversely extending sleeve member 54 is welded within aligned apertures in the forward end of the channel member 38. A pivot pin 56 passes through the sleeve 54 and the apertured end portions of the upper parallel link 14. A pair of straps 58 are welded to the plates 34, 36 and extend forwardly, the forward ends of the straps being apertured to receive a pivot pin 60 which passes through a corresponding aperture in the rear end of the lower link 16. Welded to the sleeve 54 is a bifurcated hopper mounting member, indicated generally at 62. The bight portion 64 of the mounting member 62 has a pair of spaced apart notches 66. A small hole 68 is provided in the upper rear surface of the channel member 38 and this member cooperates with a swinging cam latch 70 in a manner more fully explained below.

A transverse bearing 72 in the form of a sleeve is carried by the channel member between the transverse sleeve 54 and the hole 68. A shaft 74 is rotatably journaled within the bearing 72. Mounted on the shaft 74 for rotation therewith is a large sprocket 76 and a casting 78. The sprocket 76 has a hub portion 80 suitably apertured to receive a shear pin 82 passing through a suitable aperture in the shaft 74. A second relatively smaller sprocket 84 is secured to the casting 78 by means of cap screws 86. A drive chain 88 passes over the large sprocket 76 and over a drive sprocket (not shown) mounted on a transversely extending jackshaft on the transverse frame 12 to transmit rotary movement to the sprocket 78.

SEED SELECTORS

As previously noted, both a single-run seed selecting mechanism and a sliding finger seed selector are mounted on the seed boot 24. The single-run seed selecting mechanism consists of a casting 90 and a seed wheel or cup 92. The casting 90 is secured to the right side of a channel member 38 by means of cap screws 94 (only one being shown in FIG. 2). Seeds are received into the casting 90 through a funnel portion 96. The casting 90 is provided with a hub portion through which the right-hand end of the shaft 74 projects. The seed wheel 92 is slidably, nonrotatably carried by the shaft 74 and is caused to bear against the right-hand side of the casting 90 by a spring 100, the spring being disposed between right and left washers 102, 104, the right washer being held in place by a pin 106.

Each face of the seed cup 92 is provided with a fluted circular groove, there being a relatively small groove, or run, for maize or sorghum, this being indicated at 108, and a relatively large fluted circular groove 110, this being suitable for soy beans. Seed may pass from the funnel portion 96 of the casting through an opening 112 in the casting on that side against which the wheel 92 bears, the seed passing into the groove or run and being carried to a discharge receptacle portion 114 of the casting. The wheel 92 may be reversed on the shaft depending upon which face 108, 110 it is desired to use. The discharge receptacle portion 114 is open at its lower end and discharges the seed selected by the seed wheel 92 through the opening 52 in the seed boot and then through the seed tube 50 into the furrow.

The sliding finger seed selecting mechanism 32 is of the type more fully disclosed in U.S. Pat. No. 3,552,601 previously referred to. This mechanism includes a plurality of fingers 116 carried by a holder 118 which moves the fingers rotatably against a wear plate 120. A cam (not shown) causes the seed engaging portion of the fingers 116 to move away from the plate 120 as the fingers pass through a seed supply area permitting seed to become trapped between the seed engaging portion and the plate, the seed engaging portion of the fingers then moving towards the plate to hold trapped seed in a sliding relation against the plate until the seed is caused to be discharged through an outlet or aperture 122 in the plate 120. The seed is then conveyed to the ground by a mechanism of a type disclosed in U.S. Pat. No. 3,308,774.

Figure 2:
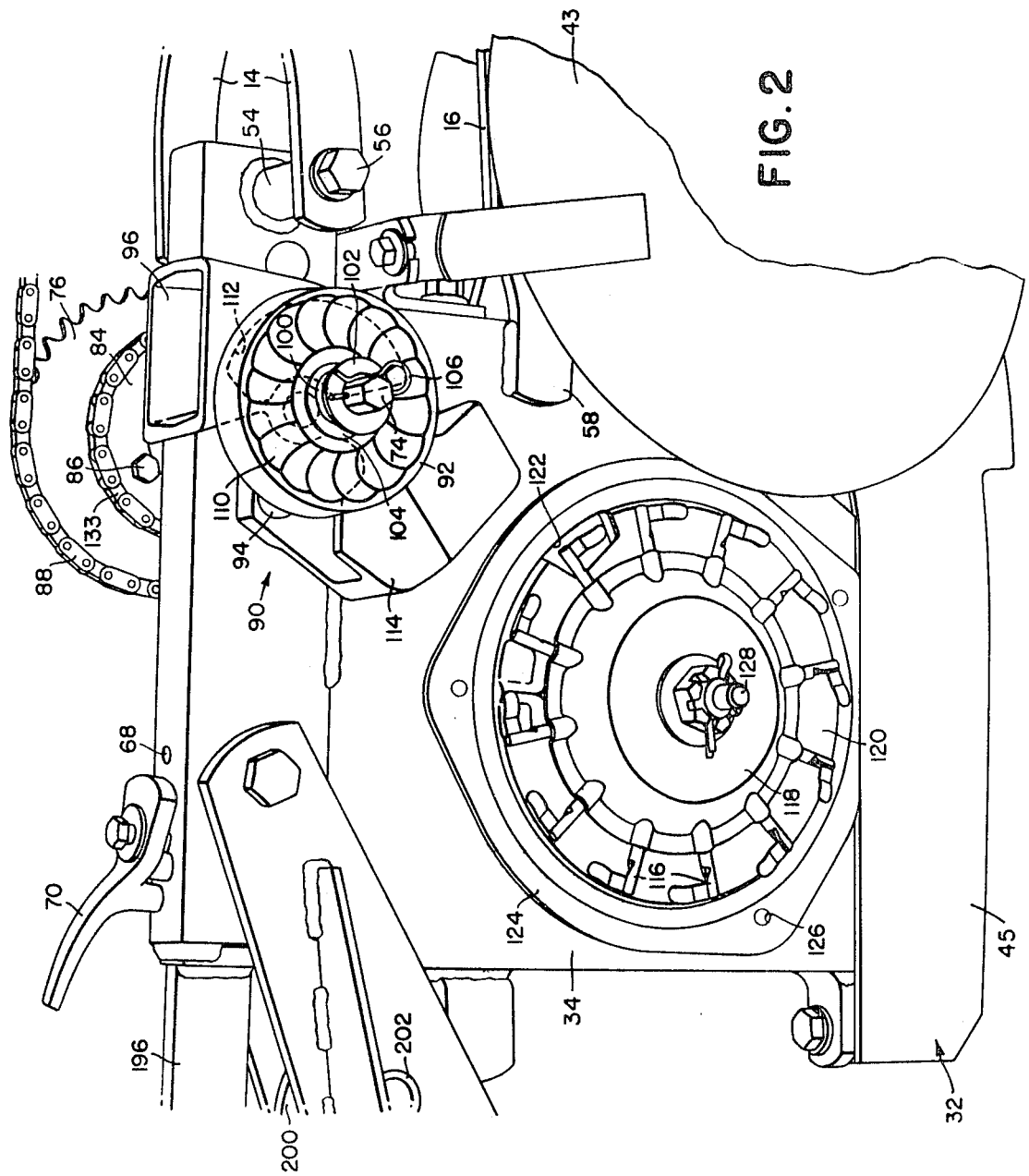
FIG. 2 is an enlarged perspective view of a portion of the planter shown in FIG. 1, certain parts having been removed.
Figure 3:
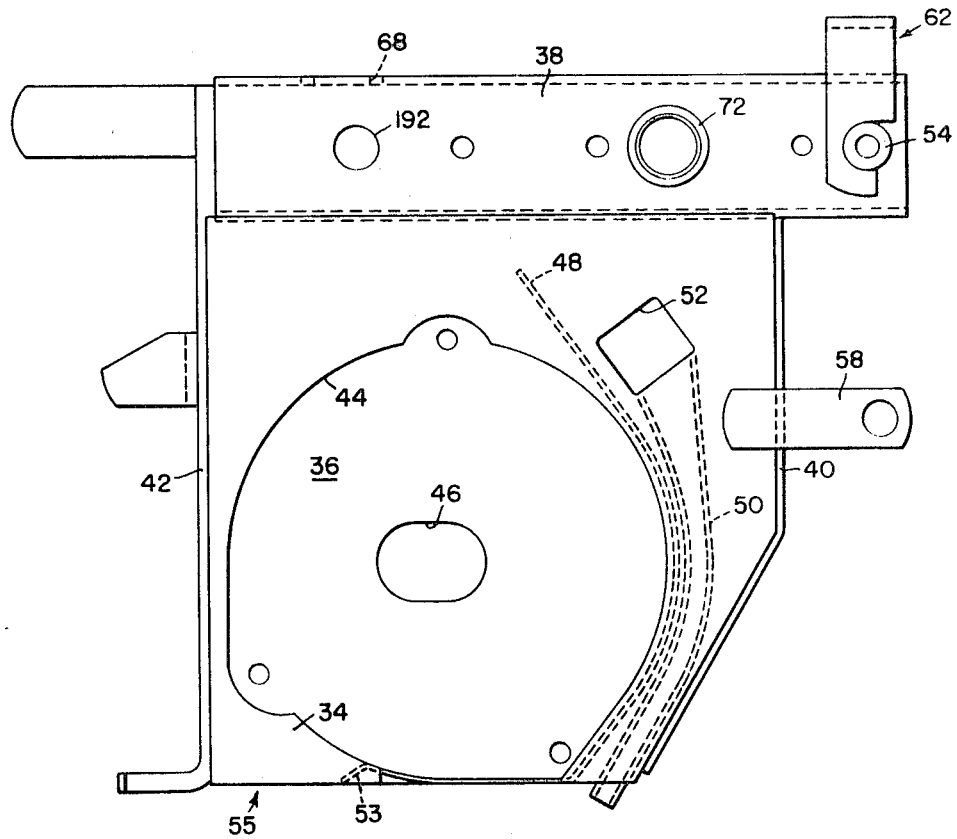
FIG. 3 is a side elevation of the seed boot shown in FIGs. 1 and 2.

The sliding finger seed selector 32 has a flanged main frame member 124 which is received within the aperture 44 of the plate 34, the flange bearing against the right-hand side of the plate 34. Conventional fasteners pass through the apertures 126 in the main frame member and secure the sliding finger seed selector within the boot 22. The holder 118 is mounted on a rotatable shaft 128 whose left-hand ends projects out of the aperture 46 in the plate member 36. Mounted on the shaft 128 is a one-way clutch 130 and connected to the clutch is a sprocket 132 in such a manner that clockwise movement only (when viewed from the right as in FIG. 2) is transmitted to the fingers 116. The sprocket 132 is driven from sprocket 84 by means of a chain 133 (FIG. 2).

When the single-run mechanism is used to select the seed, then it is desirable to disconnect the drive to the sliding finger pickup mechanism 32. This is accomplished by removing the cap screws 86 from the casting 78 and sliding the sprocket 84 to the right.

The seed is held against the sliding finger seed selector by means of a cover member 134. The cover member 134 is provided with an aperture in its lower portion which receives seeds through a seed chute 136, the upper end of the seed chute being selectively connectable with a discharge opening in the hopper 18.

HOPPER

The hopper 18 has a bottom or base plate 135 having forward and rear openings 138, 140 respectively through which the seed may be selectively discharged into either the seed chute 136 or the funnel portion 96. Rotatably mounted on a pivot 150 and disposed below the openings 138 and 140 is the disk 28 having a single aperture 144. The disk is also provided with three notches 146. A spring detent 148 is carried by the hopper and has a downturned end which may be disposed within any of the notches 146 to hold the disk in a desired position. The disk can be disposed in one position with the opening 144 disposed below the opening 138, in another position with the opening 144 disposed below the opening 140, or in a third position with the opening 144 disposed below a portion of the hopper which has no opening. By thus selectively positioning the disk, it is possible to feed into either the funnel 96, the seed chute 136, or into neither. The disk 28 is rotatably carried about a rivet 150. Disposed below the disk 28 is a fixed generally rectangular plate 152 which has rectangular openings 154 and 156 which cooperate respectively with openings 138 and 140. The plate member 152 is secured in position by the rivet 150 and also by a bracket 158 which seats in a notch 160 on one corner of the plate 152. The bracket 158 is secured to the rear bottom side 162 of the hopper by means of a nut and bolt 164, and the bracket 158 includes a lower horizontally extending portion 166 having a downwardly extending pin 168.

The bottom forward portion 170 of the hopper is provided with a pair of downwardly extending cylindrical portions 172 having lower generally horizontal surfaces. A strap 174 is secured to and extends between the two portions 172 and a fastener 176 is carried at each end of the strap 174. The faster 176 has a head portion 178 carried by a cylindrical shank portion 180, the head 178 being spaced away from the strap 174.

The hopper 18 can be quickly assembled onto the seed boot 24 by positioning the fasteners 176 within the notches 66 in such a manner that the shank portions 180 are seated in the notches 66 and the heads 178 are disposed below the bight portion 64. In this position the pin 168 may be inserted in the hole 68. The hopper can then be locked into position by swinging the cam latch 70 over the horizontal portion 166 of the bracket 58 to hold the hopper onto the seed boot. To provide for manufacturing variations, the lower surface of the plate 152 is designed to be disposed approximately one-fourth inch above the upper end of the funnel portion 96 and the seed chute 136. To insure that the seed will fall within either the funnel or the seed chute, rubber gaskets (not shown) are provided for the funnel and chute, each gasket having a lower portion which is received within the top of the funnel or chute and an upper or flared portion which bears against the plate member 152.

PRESS WHEEL ASSEMBLY

A press wheel assembly 22 is provided to the rear of the seed boot 24 and serves to gauge the working depth of the opener 32. The press wheel assembly 22 includes a press wheel 182 journaled for rotation between arms 184 which are carried at their forward end by a transversely extending frame member 186. An additional pair of arms 188 are welded at their rear ends to the transverse frame member 186. The forward ends of the arms 188 are apertured and bolt 190 passes through the apertures and a corresponding aperture 192 in the channel member 38, the pivot bolt 190 being secured in position by a nut 194. A stop member 196 is welded to an upper rear portion of the boot 24 and extends rearwardly therefrom. A rotatable cam stop, indicated generally at 198, is carried between the arms 188 and is adapted to cooperate with the stop 196. The cam stop 198 includes a cam member 200 which is fixed to a shaft 202 rotatably disposed within a pair of aligned apertures in arms 188. Handle member 204 is rigidly secured to the left-hand end of the shaft 202, the handle having a pin portion (not shown) which is adapted to be disposed in one of a plurality of circumferentially spaced holes 206. The handle 204 is normally biased to the right by a spring (not shown) disposed about the shaft 202 between the left-hand arm 108 and the cam member 200.

To change the working depth of the planter, it is only necessary to pull the handle 204 to the left, rotate the cam stop assembly 198 to the desired position, and then permit the pin to be disposed within the desired hole 206 by the action of the spring. When the planting unit is then lowered, the stop assembly 198 will bear against the fixed stop 196 regulating the depth to which the planter unit will work.

OPERATION

Figure 4:
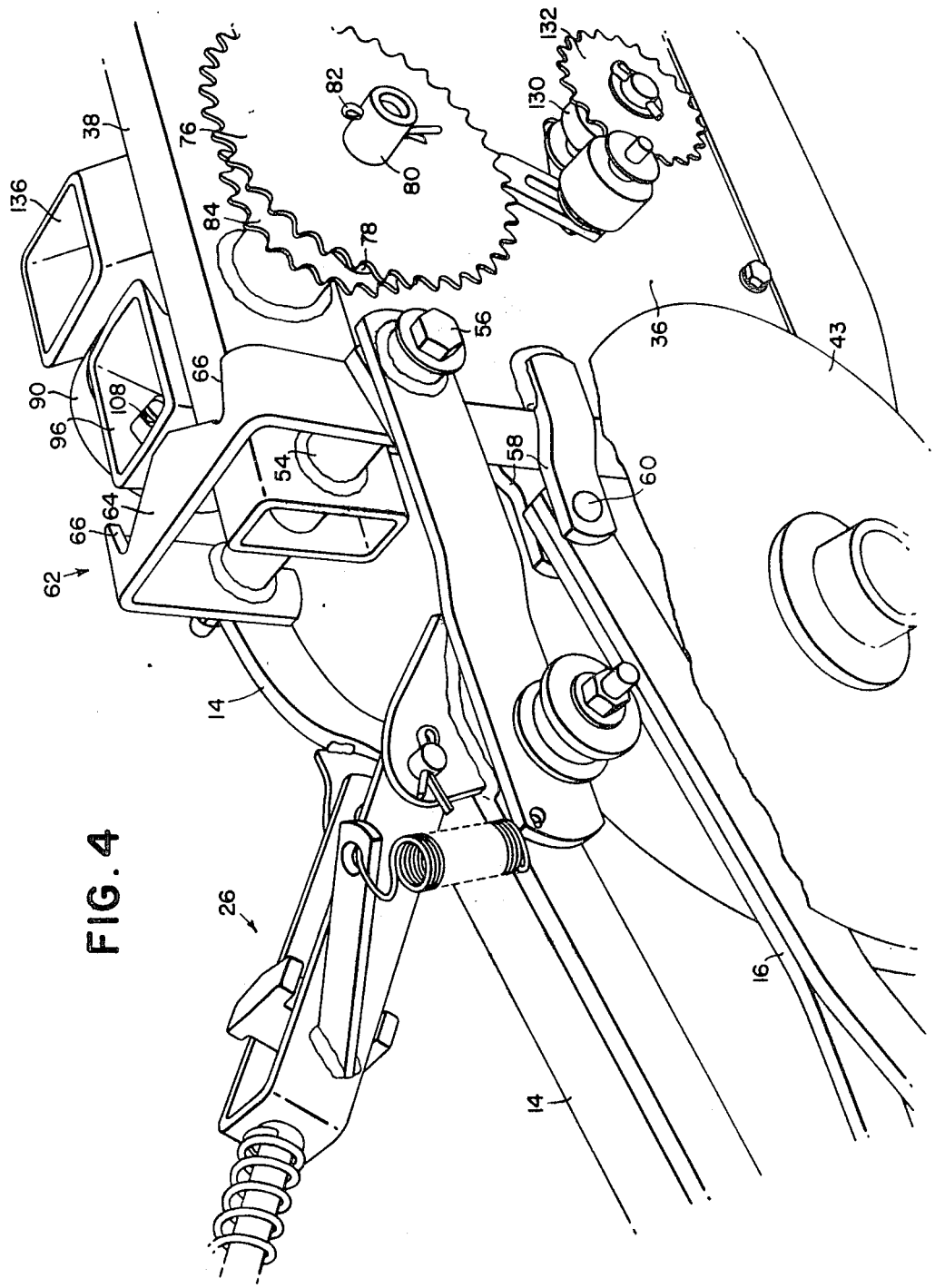
FIG. 4 is a perspective view taken from the left side of the planter shown in FIG. 1, portions having been removed.
Figure 5:
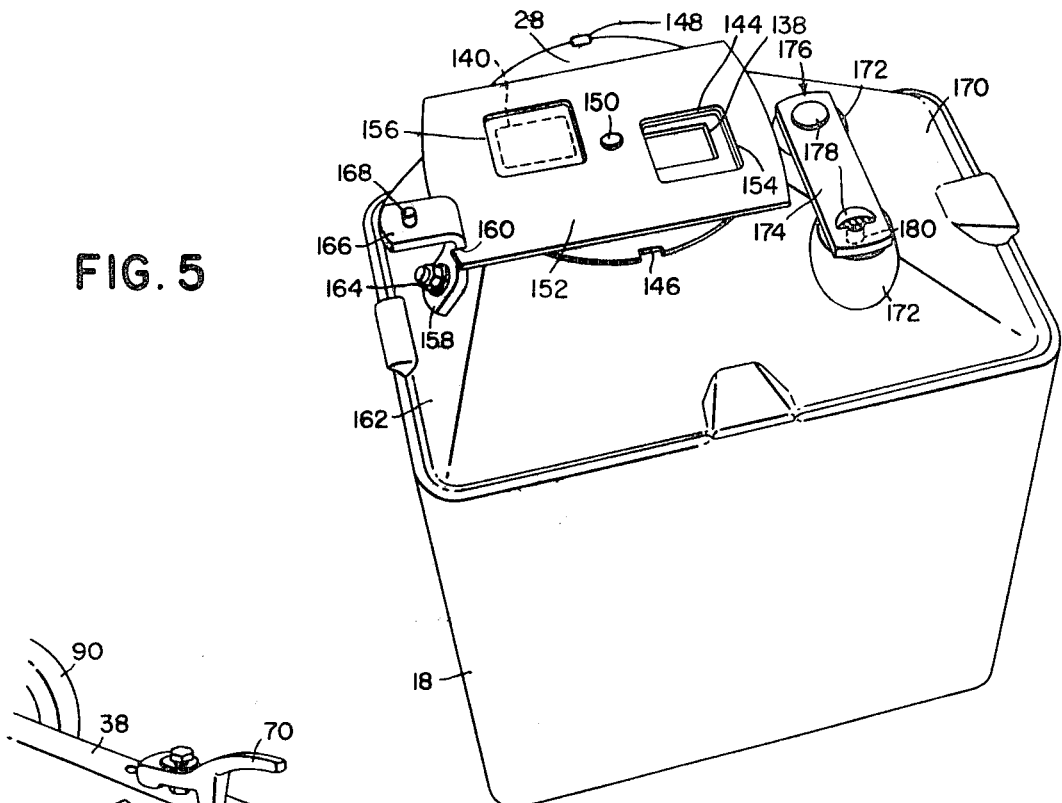
FIG. 5 is a perspective view of the bottom of the hopper shown in FIG. 1.
Figure 6:
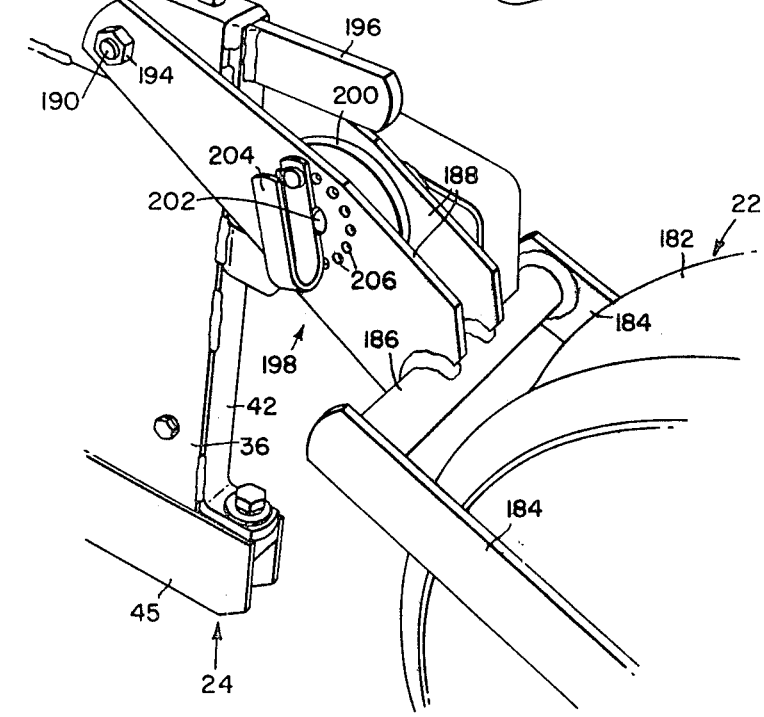
FIG. 6 is a perspective view taken from the left side of the planter unit illustrating the manner in which the press wheel is secured to the seed boot.
Figure 7:
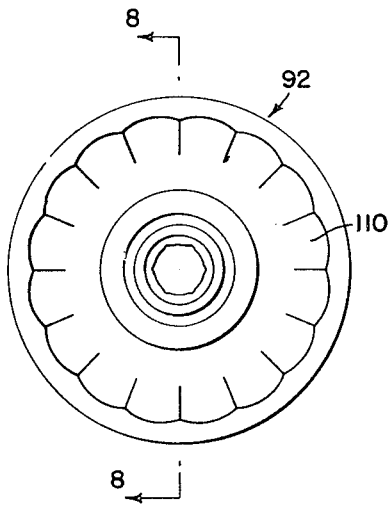
FIG. 7 is a view looking into one side of the feed cup on the planter.
Figure 8:
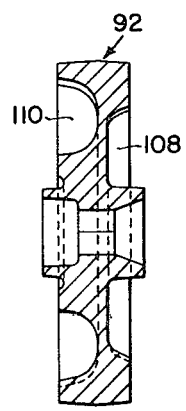
FIG. 8 is a sectional view taken substantially along the line 8—8 of FIG. 7.
Figure 9:
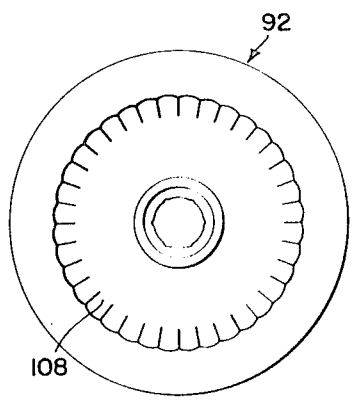
FIG. 9 is a view looking into the opposite side of the feed cup as shown in FIG. 7.

The operation of the novel planter of this invention is as follows: When corn is to be planted, the hopper, mounted as shown in FIG. 1 is filled with seed. The disk 28 is rotated to the position where the forward aperture 138 in the bottom of the hopper 18 is covered and the rear opening 140 is uncovered by the opening 144 in the disk. The corn will then be free to flow to the cover member 134 through the seed chute 136. The press wheel is then adjusted to gauge the proper planting depth by adjusting the cam 200 and the desired down pressure is adjusted through the member 26. The frame 12 is then lowered, disposing the planter in its planting position, and forward movement will cause the furrow opener 20 to open a furrow. As the planter is moved forwardly, the transverse jackshaft on the frame 12 is rotated driving the chain 86 which will in turn drive the chain 133 and sprocket 132. Rotation of the sprocket 132 in a counterclockwise direction (when viewed from the left as in FIG. 4) will be transmitted through the one-way clutch 130 and shaft 128 to the fingers 116. Seed will then be selected by the fingers and discharged in to the opened furrow.

To change from corn to soy beans, the hopper 18 should be emptied as well as the cover member 134. To accomplish this, the disk 28 is first moved to a position where both openings 138 and 140 are covered. The hopper 18 is then unfastened from the seed boot by swinging the cam member 70 so that it no longer engages the horizontal strap portion 166 of bracket 158, and then sliding the hopper away from the notches 166. The hopper can then be removed and cleaned out with great facility. The cover member 134 can be cleaned out by removing the cover plate 208 which will permit seed to be emptied out of the seed supply area. The hopper is then repositioned on the boot and locked in position by means of the swinging cam latch 70. It is then filled with soy beans and the cup is positioned with the run 110 in communication with the right side of the casting 90. The drive to the sliding finger seed selecting mechanism is disconnected by removing the cap screws 86. The disk is then positioned so that the opening 138 is uncovered by the opening 144. It is then only necessary to reposition the press wheel and adjust the down pressure if it is not initially properly set.

If sorghum were to be planted instead of soy beans, the cup 92 would be positioned so that the small circular fluted groove 108 is adjacent the right-hand side of the casting 90.

We claim:

1. A seed planter having a mobile frame, a furrow opener supported in the frame and having its lower portion adapted to open a ground furrow as the frame advances, a hopper having at least one opening in the bottom thereof supported on the frame above the furrow opener; a pair of rotary seed selecting structures supported to rotate about horizontal axes on the frame and in spaced apart relation below the hopper and above the lower portion of the furrow opener and having seed delivery means for delivering seed to a furrow opened by the opener, a seed delivery chute for each of said seed selecting structures with each chute opening into its seed selecting structure and having an inlet at the bottom of the hopper; drive means on the frame for selectively driving one of said seed selecting structures to the exclusion of the other; means interposed between the chute inlets and said hopper bottom and manually settable to selectively restrict flow of seed from the aforesaid hopper opening through one inlet of a seed delivery chute while permitting flow of seed from the hopper through the inlet of the other seed delivery chute; and a furrow closing device supported on the frame behind said seed delivery means.

2. A seed planter having a mobile frame, a furrow opener mounted on the frame and having its lower portion adapted to open a ground furrow as the frame advances, a hopper having at least one opening in the bottom thereof supported on the frame above the furrow opener; a first seed selecting mechanism having a rotary member rotatable about a horizontal axis and with a plurality of spring-biased radial fingers, each adapted to close upon a seed and slide it on a fixed vertical surface to a discharge outlet; a second seed selecting mechanism including a rotary member rotatable about a horizontal axis and adapted to feed seed through an outlet in a generally continuous stream; means supporting the first and second seed electing mechanisms or the frame in spaced apart relation below the hopper and above the lower portion of the furrow opener; seed delivery means for delivering seed from the respective outlets of the seed selecting mechanisms to a furrow opened by the opener; seed chutes extending from the hopper to the seed selecting mechanism and having seed inlets for each of said seed selecting mechanisms at the bottom of the hopper; means interposed between the chute inlets and said hopper bottom manually settable to selectively prevent flow of seed from the aforesaid hopper opening through the inlet of one of the chutes while permitting flow of seed from the hopper through the inlet of the other chute; and a furrow closing device supported on the frame behind said seed delivery means.

3. The seed planter defined in claim 2 further characterized by drive means for driving the rotary members of the first and second seed selecting mechanisms, said drive means being manually adaptable to drive one rotary member to the exclusion of the other.

4. A seed planter having a mobile frame, a furrow opener having its lower portion adapted to open a ground furrow as the frame advances, a hopper supported on the frame above the furrow opener; a pair of rotary seed selecting structures operable independently of one another and supported to rotate on horizontal axes on the frame in fore-and-aft spaced apart relation below the hopper and above the lower portion of the furrow opener, seed delivery means on the frame for delivering seed from the respective seed selecting structures to a furrow opened by the opener, seed chutes extending between the bottom of the hopper and seed selecting structures with each having an inlet at the bottom of the hopper, means interposed between the inlets and hopper bottom manually settable to selectively prevent flow of seed from the hopper through the inlet of one of the chutes while permitting flow of seed from the hopper through the inlet of the other of the chutes; drive means at least part of which is mounted on the frame for driving the seed selectors; and a furrow closing device supported on the frame behind said seed delivery means.

* * * * *

UNITED STATES PATENT OFFICE
CERTIFICATE OF CORRECTION

Patent No. 3,626,877      Dated 14 December 1971

Inventor(s) Harold Valentine Hansen, Robert Leroy Chidester and Hans Joachim Roehricht It is certified that error appears in the above-identified patent and that said Letters Patent are hereby corrected as shown below:

Column 6, line 26, change "in" to -- on --; line 58, change "electing" to -- selecting --; same line, change "or" to -- on --.

Signed and sealed this 22nd day of August 1972.

(SEAL)
Attest:

EDWARD M. FLETCHER, JR.
Attesting Officer

ROBERT GOTTSCHALK
Commissioner of Patents